(12) United States Patent
Lu

(10) Patent No.: US 8,919,657 B2
(45) Date of Patent: Dec. 30, 2014

(54) RFID TAG WITH REINFORCED STRUCTURE

(71) Applicant: Claridy Solutions, Inc., Hsinchu (TW)

(72) Inventor: Sui-Feng Lu, Hsinchu (TW)

(73) Assignee: Claridy Solutions, Inc., Hsinchu (TW)

( * ) Notice: Subject to any disclaimer, the term of this patent is extended or adjusted under 35 U.S.C. 154(b) by 48 days.

(21) Appl. No.: 13/828,812

(22) Filed: Mar. 14, 2013

(65) Prior Publication Data
US 2014/0263661 A1  Sep. 18, 2014

(51) Int. Cl.
*G06K 19/06* (2006.01)
*G06K 19/077* (2006.01)

(52) U.S. Cl.
CPC ................................ *G06K 19/07728* (2013.01)
USPC ........................................................ 235/492

(58) Field of Classification Search
CPC .............................................. G06K 19/07728
USPC ................................. 235/492; 340/10.1–10.6
See application file for complete search history.

(56) References Cited

U.S. PATENT DOCUMENTS 8,002,195 B2 * 8/2011 Baba et al. ................... 235/492

* cited by examiner

*Primary Examiner* — Jamara Franklin
(74) *Attorney, Agent, or Firm* — Banger Shia

(57) ABSTRACT

A RFID tag with reinforced structure is capable of reducing the chance of electrical disconnection between the silicon chip and the antenna, extending the life of the RFID tag, and improving the accuracy of reading the RFID tag. The RFID tag is provided with a base, a silicon chip, an antenna and at least one reinforced portion. The base includes a first outer surface and an opposite second outer surface. The chip is disposed in the base and provided with a plurality of chip-electric-connection portions. The antenna is disposed in the base and provided with a plurality of antenna-electric-connection portions to be electrically connected to the chip-electric-connection portions. The reinforced portion protrudes from the first or second outer surface of the base.

12 Claims, 9 Drawing Sheets

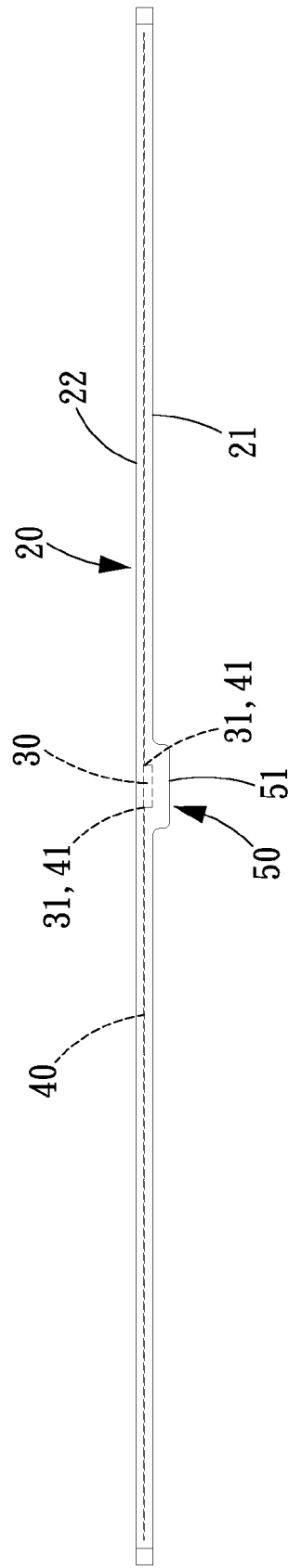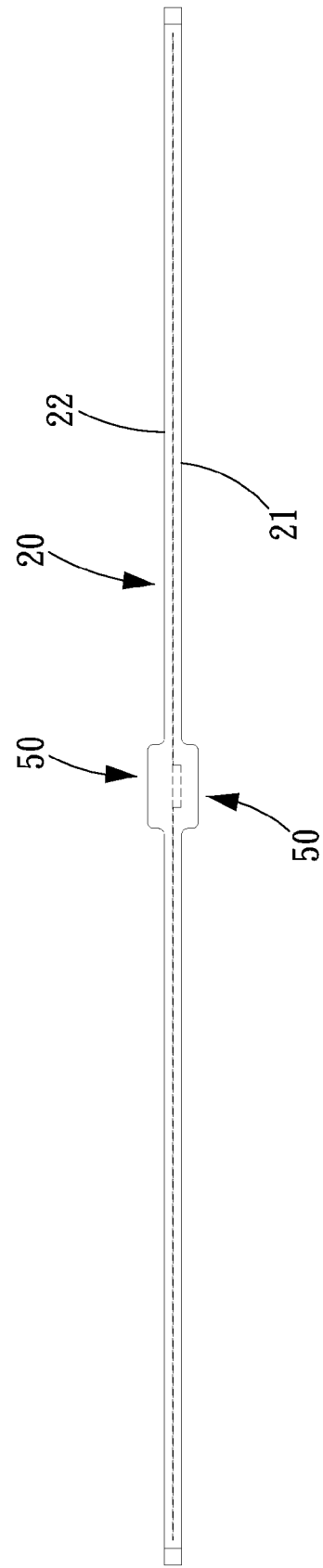

RFID TAG WITH REINFORCED STRUCTURE

BACKGROUND OF THE INVENTION

1. Field of the Invention

The present invention relates to a RFID tag, and more particularly to a RFID tag with reinforced structure.

2. Description of the Prior Art

RFID (Radio Frequency Identification) is a kind of communication technology and essentially comprises wireless information processing technology, reader, and RFID tag. RFID can be used in a variety of applications, such as inventory and logistics management, asset management, library management, access control, an anti car chip theft, as identification and tracking applications.

As shown in FIG. 1, a conventional RFID tag 10 generally comprises a base 11 on which are disposed a chip 12 and an antenna 13 connected to the chip 12. The RFID tag 10 allows reading and writing data in a non-touch manner when used in combination with a reader, and it further allows the reader to access and read the data of the RFID tag 10, and the data acquired by the reader is provided to the backend application system for further processing, use or value-added use. However, this RFID tag 10 still suffers from the following shortcomings.

Firstly, when the RFID tag 10 is disposed on a soft material, such work clothes, hoods, hats or work shoes, the base 11 of the RFID tag 10 should be sealed with soft material (such as plastic). However, the combination of the chip 12 and the antenna 13 will become a very thin and uniform thickness sheet after being packed in the base 11, therefore, the base 11 is likely to bend when the RFID tag 10 is used in the above-mentioned condition, consequently, the antenna 13 or the chip 12 in the base 11 will also deform. Long time and repeated bending will cause damage to RFID tag 10, and mostly, the damage is electrical disconnection between the chip 12 and the antenna 13. In other words, the base 11 is vulnerable to repeated bending due to the fact that there is no protection for the electric connection between the chip 12 and the antenna 13.

Secondly, the outer surface 111 of the base 11 of the RFID tag 10 is flat and smooth, the electric waves generated by the reader are likely to be absorbed by human body or moisture, when the RFID tag 10 is attached or close to a human body, or close to a moisture-containing surface, making it difficult for the reader to read the RFID tag 10. Especially for the RFID tag 10 whose operating frequency is ultra high.

The present invention has arisen to mitigate and/or obviate the afore-described disadvantages.

SUMMARY OF THE INVENTION

The primary objective of the present invention is to provide a RFID tag with reinforced structure, which is capable of strengthening the structural strength of the base of the RFID tag, reducing the chance of electrical disconnection between the chip and the antenna, and extending the life of the RFID tag.

Another objective of the present invention is provide a RFID tag with reinforced structure, which is capable of improving the accuracy of reading the RFID tag by forming a dielectric gap between the chip and the antenna and the human body or the object to which the RFID tag is to be attached.

To achieve the above objective, a Radio Frequency Identification tag with reinforced structure in accordance with the present invention comprises a base, a chip, an antenna and at least one reinforced portion. The base includes a first outer surface and an opposite second outer surface. The chip is disposed in the base and provided with a plurality of chip-electric-connection portions. The antenna is disposed in the base and provided with a plurality of antenna-electric-connection portions to be electrically connected to the chip-electric-connection portions. The reinforced portion protrudes from the first or second outer surface of the base.

Preferably, there are two reinforced portions, one formed on the first outer face of the base, and the other formed on the second outer face of the base.

Preferably, the reinforced portion includes at least two ribs, and between the two ribs is defined an interval.

Preferably, the reinforced portion includes at least two circular pillars, and between the two circular pillars is defined an interval.

Preferably, the reinforced portion includes at least two semispheres, and between the two semispheres is defined an interval.

Preferably, the reinforced portion is located at a conjunction of the chip-electric-connection portions and the antenna-electric-connection portions.

BRIEF DESCRIPTION OF THE DRAWINGS

FIG. 3 is a side view of the RFID tag with reinforced structure in accordance with the first preferred embodiment of the present invention;

FIG. 4 is a side view of a RFID tag with reinforced structure in accordance with a second preferred embodiment of the present invention;

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
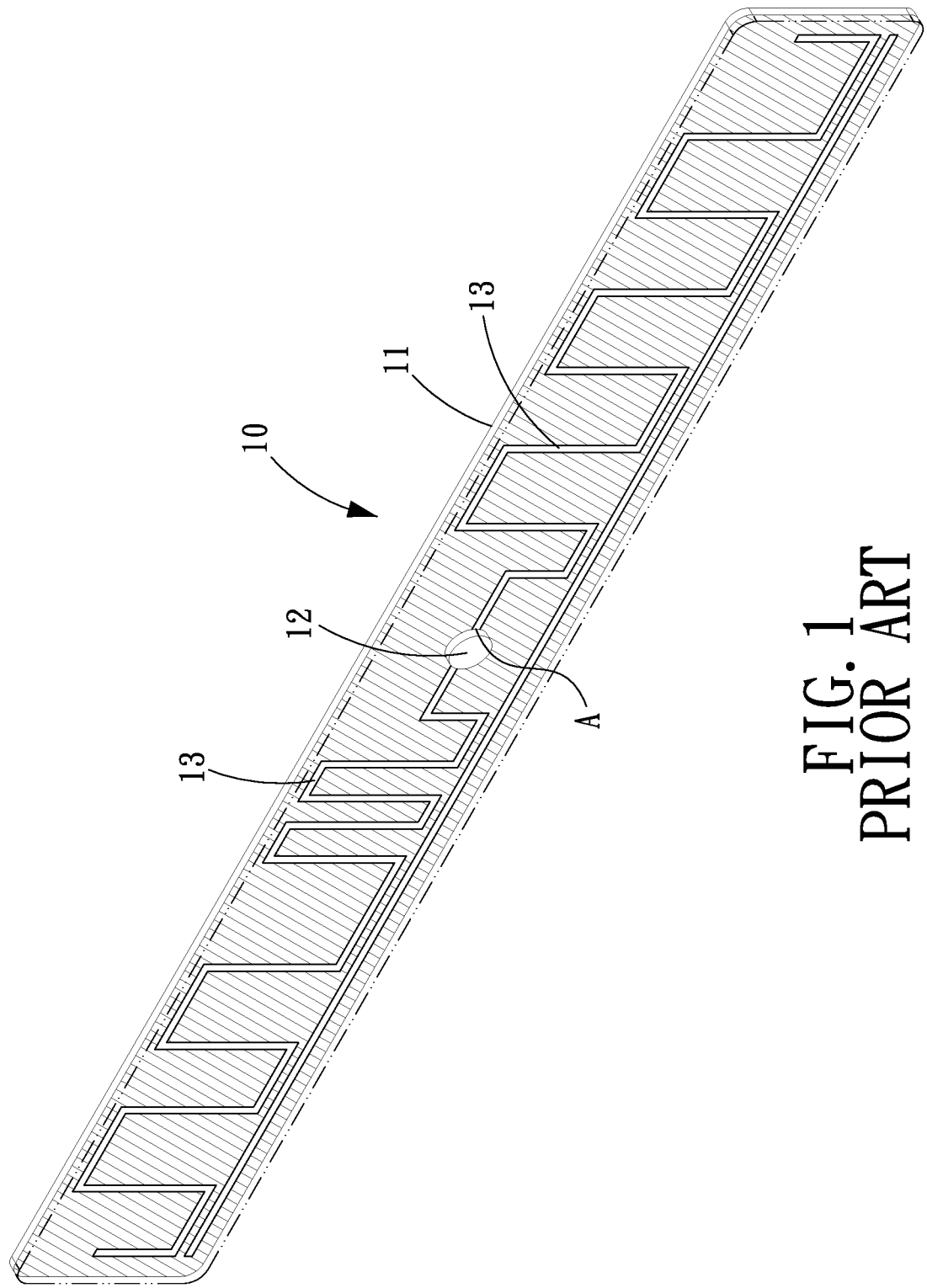
FIG. 1 is an illustrative view of a conventional RFID tag.
Figure 2:
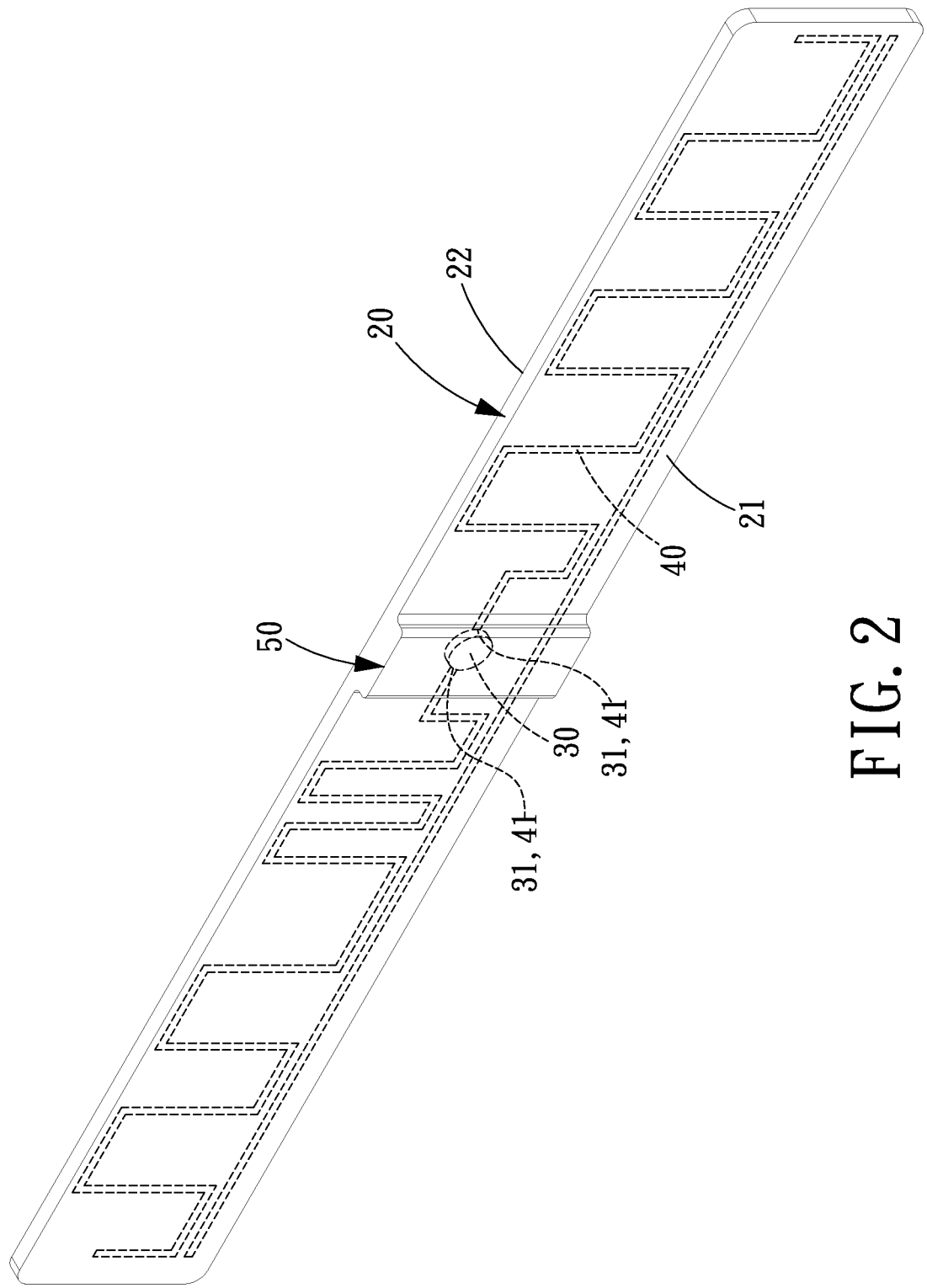
FIG. 2 is a perspective view of a RFID tag with reinforced structure in accordance with a first preferred embodiment of the present invention.

Referring to FIGS. 2-3, a RFID tag with reinforced structure in accordance with a first preferred embodiment of the present invention comprises: a base 20, a silicon chip 30, an antenna 40 and the reinforced portion 50.

The base 20 includes a first outer surface 21 and an opposite second outer surface 22.

The silicon chip 30 is disposed in the base 20 and provided with a plurality of chip-electric-connection portions 31.

The antenna 40 is disposed in the base 20 and provided with a plurality of antenna-electric-connection portions 41 to be electrically connected to the chip-electric-connection portions 31.

The reinforced portion 50 is protruded from the first outer surface 21 of the base 20 and located at the conjunction of the chip-electric-connection portions 31 and the antenna-electric-connection portions 41. In this embodiment, the reinforced portion 50 is a rectangular pillar.

Since the present invention is particularly provided on the first outer surface 21 of the base 20 with the reinforced portion 50 which is located at the conjunction of the chip-electric-connection portions 31 and the antenna-electric-connection portions 41. When the base 20 is disposed on a soft material and subjected to repeated bending, the conjunction of the chip-electric-connection portions 31 and the antenna-electric-connection portions 41 is protected by the reinforced portion 50, reducing the chance of electrical disconnection between the silicon chip 30 and the antenna 40.

On the other hand, since the reinforced portion 50 is disposed on the first outer surface 21 of the base 20, when the RFID tag is attached on the clothes, and the user's skin touches the reinforced portion 50, the thickness of the reinforced portion 50 keeps the RFID tag away from the user's body, which further prevents the reading capability of the reader from being undermined by the user's body. Hence, the present invention is capable of enhancing the accuracy of reading the RFID tag.

Referring to FIG. 4, a RFID tag with a reinforced structure in accordance with a second preferred embodiment of the present invention is similar to the first embodiment, except that:

There are two reinforced portions 50, one on the first outer surface 21 and the other on the second outer surface 22 of the base 20.

Figure 5:
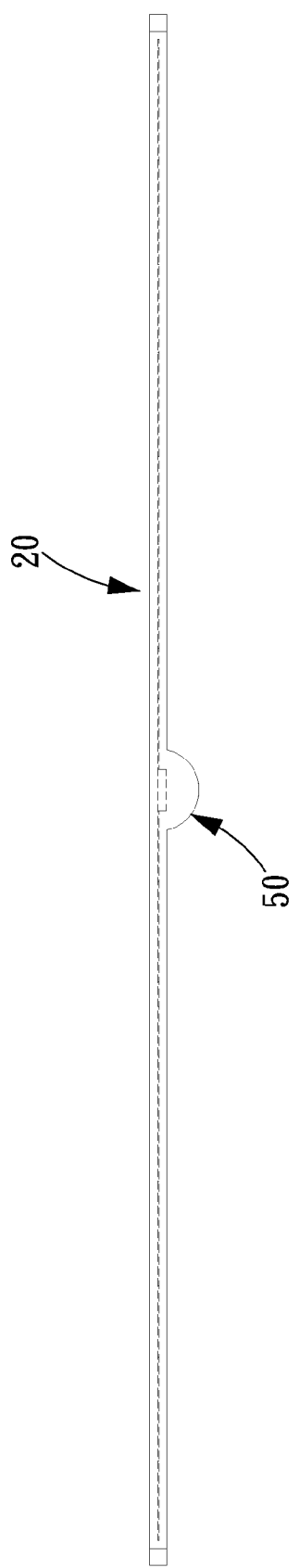
FIG. 5 is a side view of a s RFID tag with reinforced structure in accordance with a third preferred embodiment of the present invention.

Referring to FIG. 5, a RFID tag with reinforced structure in accordance with a third preferred embodiment of the present invention is similar to the first embodiment, except that the reinforced portion 50 is semispherical.

Figure 6:
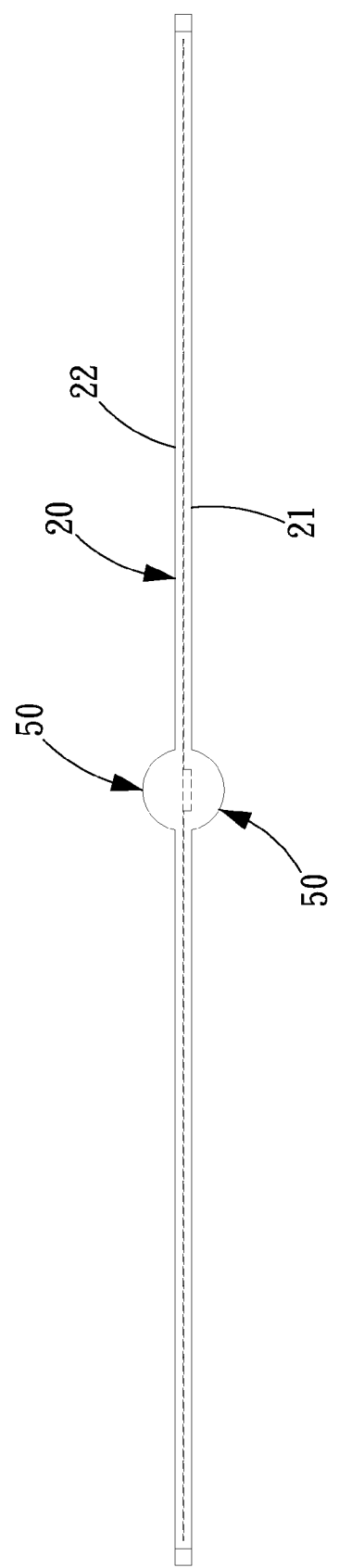
FIG. 6 is a side view of a RFID tag with reinforced structure in accordance with a fourth preferred embodiment of the present invention.

Referring to FIG. 6, a RFID tag with reinforced structure in accordance with a fourth preferred embodiment of the present invention is similar to the first embodiment, except that there are two reinforced portions 50, one on the first outer surface 21 and the other on the second outer surface 22 of the base 20, and the reinforced portions 50 are two semispheres.

Figure 7:
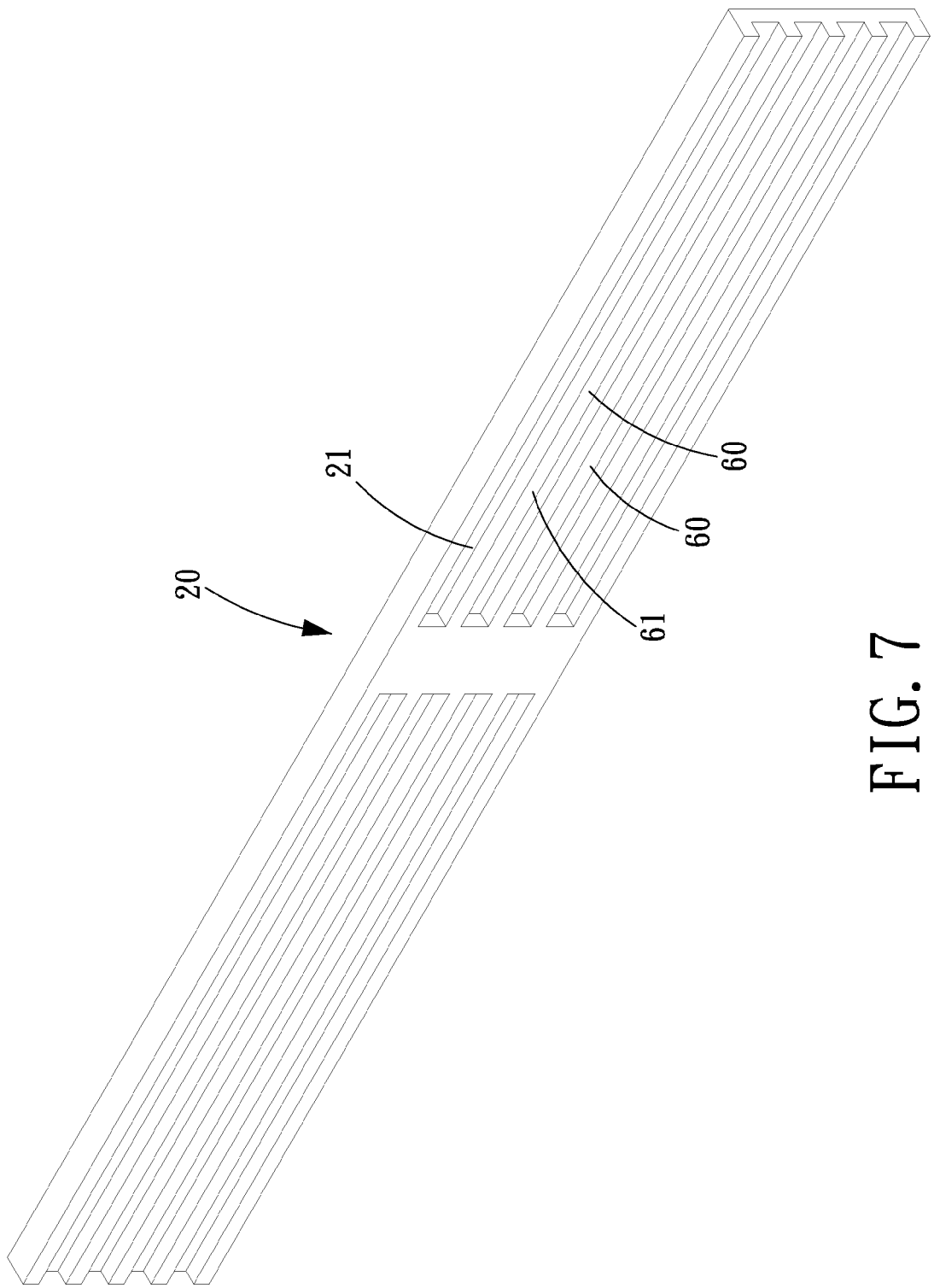
FIG. 7 is a perspective view of a RFID tag with reinforced structure in accordance with a fifth preferred embodiment of the present invention, wherein the ribs are transversely and equidistantly arranged.
Figure 8:
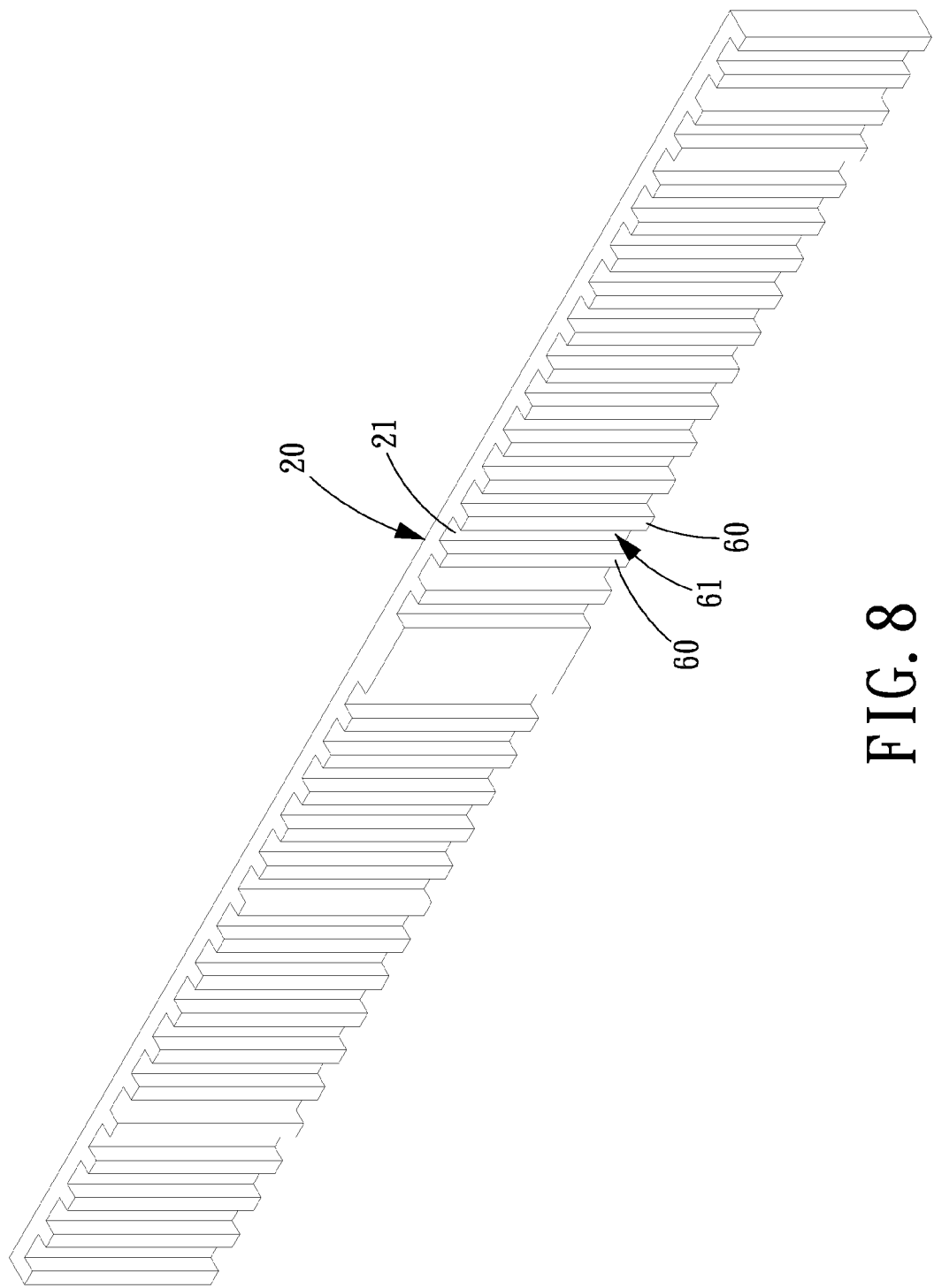
FIG. 8 is a perspective view of a RFID tag with reinforced structure in accordance with a fifth preferred embodiment of the present invention, wherein the ribs are longitudinally and equidistantly arranged.
Figure 9:
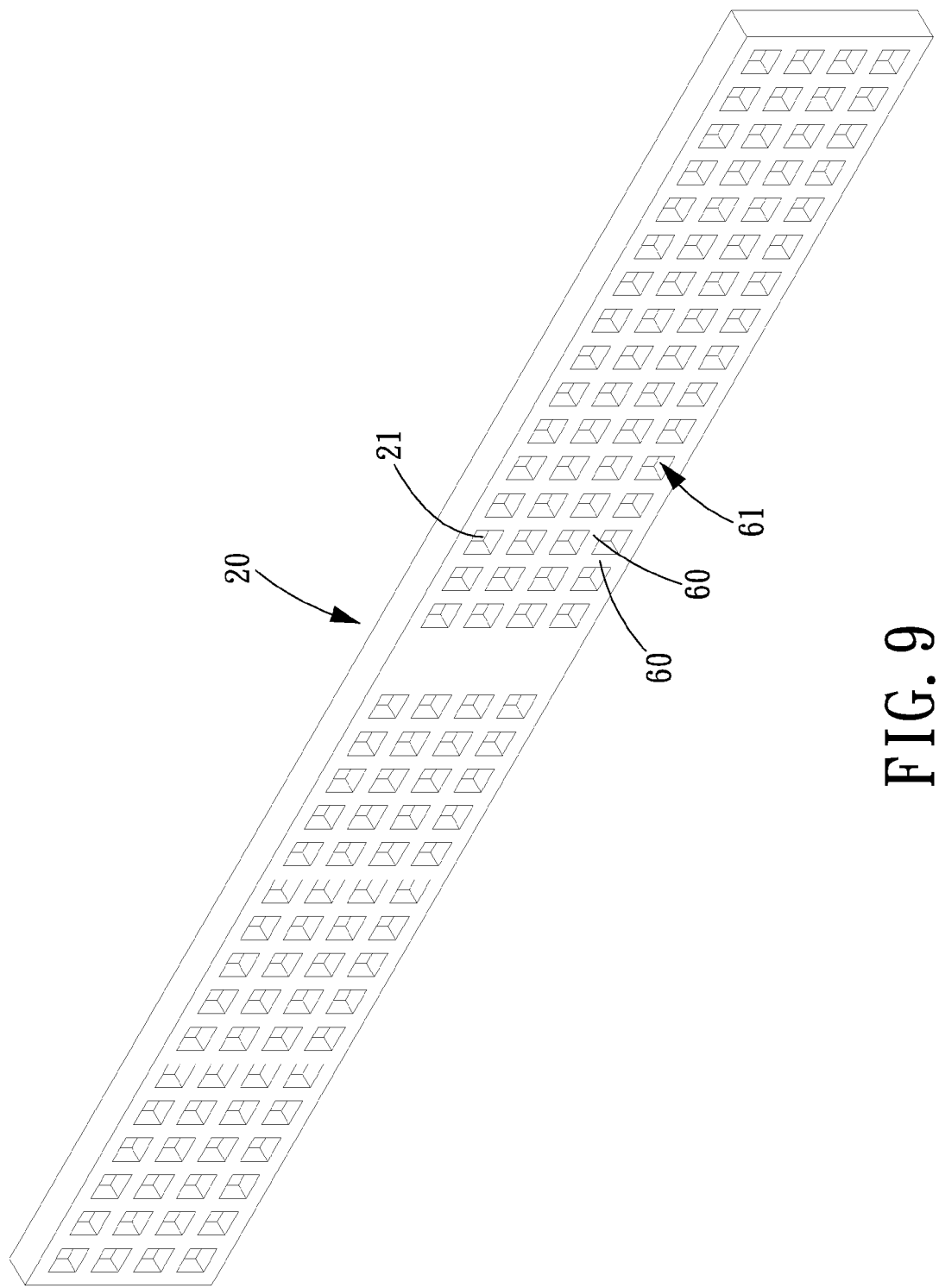
FIG. 9 is a perspective view of a RFID tag with reinforced structure in accordance with a fifth preferred embodiment of the present invention, wherein the ribs are equidistantly arranged in both transverse and longitudinal directions in a crossed manner.

Referring to FIGS. 7-9, a RFID tag with reinforced structure in accordance with a fifth preferred embodiment of the present invention is similar to the first embodiment, except that:

The RFID tag is further provided on the first outer surface 21 of the base 20 with a plurality of spaced ribs 60, and between each two neighboring spaced ribs 60 is defined an interval 61. The spaced ribs 60 further strengthened the structural strength of the base 20 of the RFID tag and provide a dielectric gap to keep the RFID tag from human body. The spaced ribs 60 can be transversely and equidistantly arranged as shown in FIG. 7, and longitudinally and equidistantly arranged as shown in FIG. 8, or can equidistantly arranged in both transverse and longitudinal directions in a crossed manner, as shown in FIG. 9.

Figure 10:
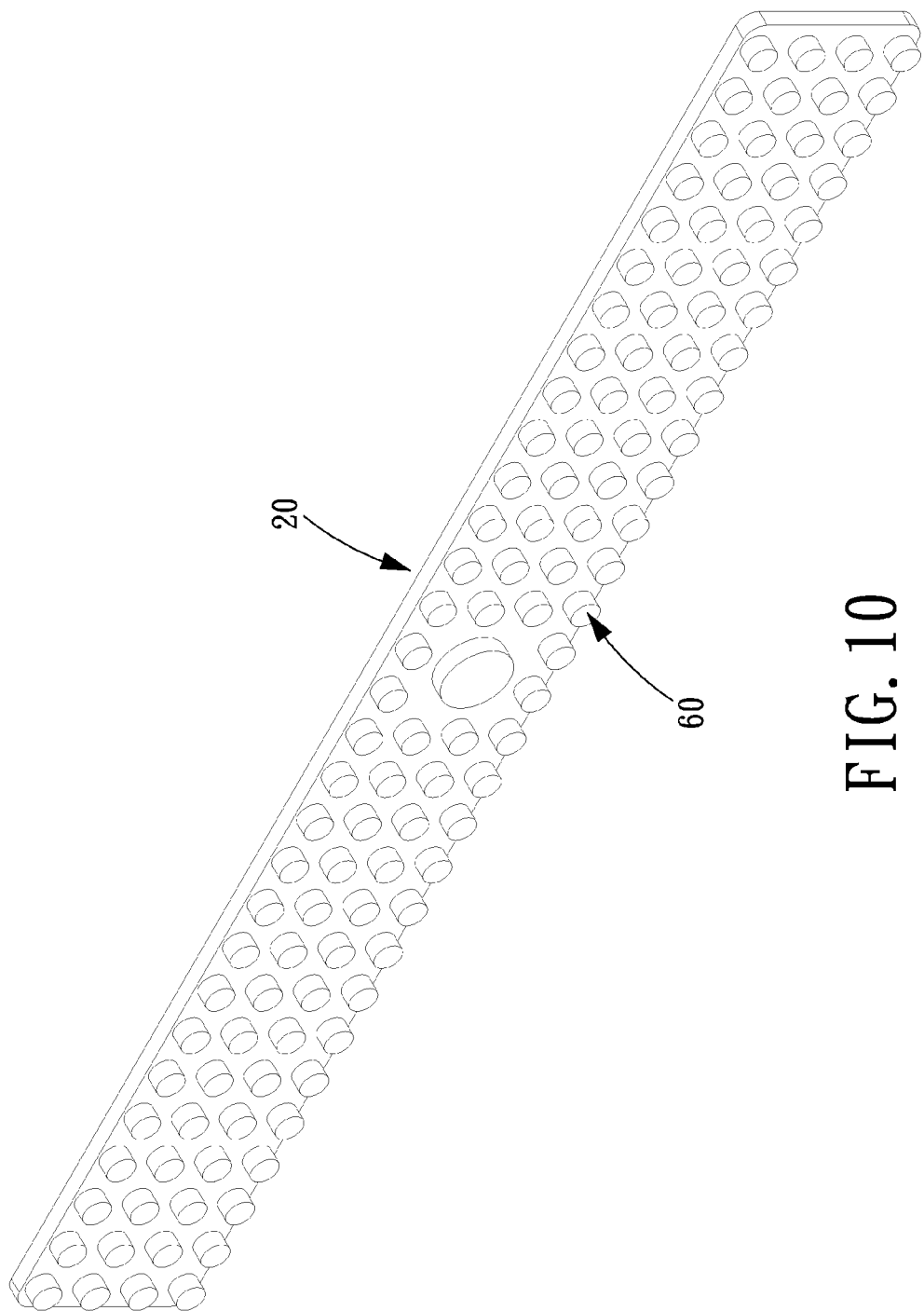
FIG. 10 is a perspective view of a RFID tag with reinforced structure in accordance with a sixth preferred embodiment of the present invention.

Referring to FIG. 10, a wireless RFID tag with reinforced structure in accordance with a sixth preferred embodiment of the present invention is similar to the fifth embodiment, except that: the spaced ribs 60 are circular pillars.

Figure 11:
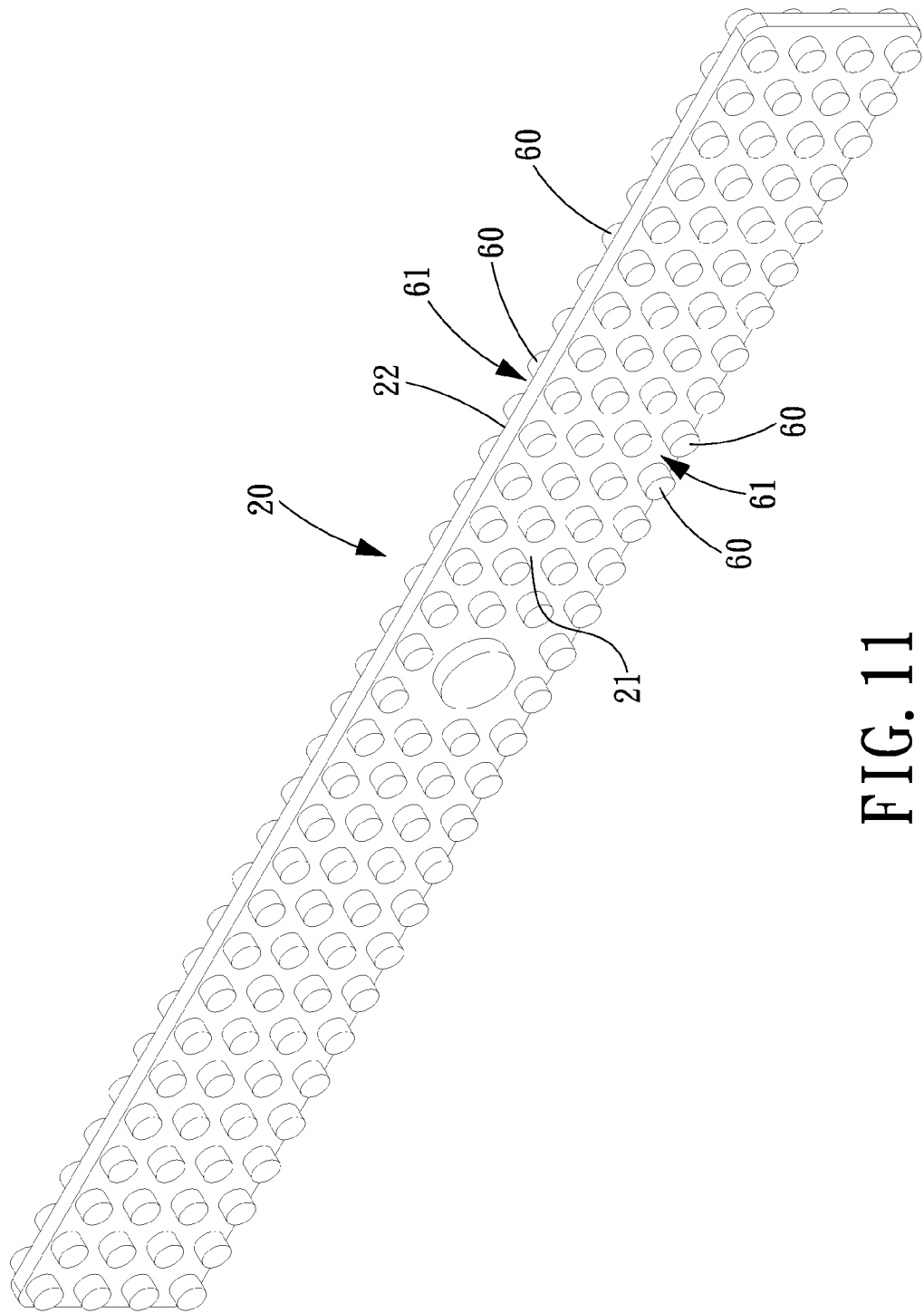
FIG. 11 is a perspective view of a RFID tag with reinforced structure in accordance with a seventh preferred embodiment of the present invention.

Referring to FIG. 11, a RFID tag with reinforced structure in accordance with a seventh preferred embodiment of the present invention is similar to the second embodiment, except that: the spaced ribs 60 are cylindrical shaped and formed both on the first and second outer surface 21, 22 of the base 20, and between each two neighboring spaced ribs 60 is defined an interval 61.

In the abovementioned embodiments, the arrangement of the spaced ribs 60 forms a dielectric gap between the silicon chip 30 and the antenna 40 of the base 20 and the human body or the object to which the RFID tag is to be attached, preventing undesired influence on sending and receiving of the electric waves.

While we have shown and described various embodiments in accordance with the present invention, it is clear to those skilled in the art that further embodiments may be made without departing from the scope of the present invention.

What is claimed is:

1. A Radio Frequency Identification tag with reinforced structure comprising: a base with a first outer surface and an opposite second outer surface; a silicon chip disposed in the base and provided with a plurality of chip-electric-connection portions; an antenna disposed in the base and provided with a plurality of antenna-electric-connection portions to be electrically connected to the chip-electric-connection portions; the Radio Frequency Identification tag characterized by: at least one reinforced portion is protruded from and integral with the first or second outer surface of the base, the at least one reinforced portion is a inseparable part of the base;

and a plurality of ribs is formed on the first surface of the base to strengthen the structure of the Radio Frequency Identification tag.

2. The Radio Frequency Identification tag with reinforced structure as claimed in claim 1, wherein the quantity of the reinforced portion is two, one of the reinforced portions is formed on the first outer surface of the base, and another of the reinforced portions is formed on the second outer surface of the base.

3. The Radio Frequency Identification tag with reinforced structure as claimed in claim 2, wherein each of the reinforced portions includes at least two pillars, and an interval is defined between each of two pillars.

4. The Radio Frequency Identification tag with reinforced structure as claimed in claim 2, wherein each of the reinforced portions includes at least two semispheres, and an interval is defined between each of two semispheres.

5. The Radio Frequency Identification tag with reinforced structure as claimed in claim 2, wherein the reinforced portions are located at a conjunction the conjunctions of the chip-electric-connection portions and the antenna-electric-connection portions.

6. The Radio Frequency Identification tag with reinforced structure as claimed in claim 1, wherein and an interval is defined between each of two neighboring ribs.

7. The Radio Frequency Identification tag with reinforced structure as claimed in claim 1, wherein the reinforced portion includes at least two cylindrical ribs, and an interval is defined between each of two pillars.

8. The Radio Frequency Identification tag with reinforced structure as claimed in claim 1, wherein the reinforced portion includes at least two semispheres, and an interval is defined between each of two semispheres.

9. The Radio Frequency Identification tag with reinforced structure as claimed in claim 1, wherein the reinforced portion is located at an conjunction the conjunctions of the chip-electric-connection portions and the antenna-electric-connection portions.

10. The Radio Frequency Identification tag with reinforced structure as claimed in claim 1, wherein the ribs are transversely arranged.

11. The Radio Frequency Identification tag with reinforced structure as claimed in claim 1, wherein the ribs are longitudinally arranged.

12. The Radio Frequency Identification tag with reinforced structure as claimed in claim 1, wherein the ribs are arranged in both transverse and longitudinal directions in a crossed manner.

* * * * *